April 9, 1963 W. E. BRADLEY 3,085,055
METHOD OF FABRICATING TRANSISTOR DEVICES
Original Filed March 26, 1954 2 Sheets-Sheet 1

INVENTOR.
WILLIAM E. BRADLEY
BY
ATTORNEY

April 9, 1963     W. E. BRADLEY     3,085,055

METHOD OF FABRICATING TRANSISTOR DEVICES

Original Filed March 26, 1954     2 Sheets-Sheet 2

INVENTOR.
WILLIAM E. BRADLEY
BY
ATTORNEY

United States Patent Office 3,085,055
Patented Apr. 9, 1963

3,085,055
METHOD OF FABRICATING TRANSISTOR
DEVICES
William E. Bradley, New Hope, Pa., assignor, by mesne assignments, to Philco Corporation, Philadelphia, Pa., a corporation of Delaware
Original application Mar. 26, 1954, Ser. No. 418,887, now Patent No. 2,846,346, dated Aug. 5, 1958. Divided and this application Sept. 12, 1957, Ser. No. 683,535
13 Claims. (Cl. 204—143)

The present invention relates to semiconductive devices, and to methods for the manufacture thereof. More particularly it relates to improved methods and apparatus for shaping semiconductive bodies accurately by electrolytic etching techniques, and to improved semiconductive devices producible by such methods. The present application is a divisional application of my copending application Serial No. 418,887, filed March 26, 1054, now U.S. Patent No. 2,846,346, and entitled "Electrical Method and Device."

Electrolytic bath etching has been utilized in the past in the production of semiconductive devices to clean or otherwise prepare the surfaces of the semiconductive material. Further, in the copending application Serial No. 395,756 of Tiley and Williams, entitled "Semiconductive Devices and Methods for the Fabrication Thereof," and filed December 2, 1953, and now abandoned, there is described a process for shaping semiconductive bodies by electrolytic jet-etching to produce predetermined configurations especially useful in semiconductive circuit devices. Such electrolytic etching procedures are particularly advantageous in that they permit shaping of the semiconductive material without introducing stresses or distortions of the crystal structure, such as are ordinarily caused by mechanical or thermal forces in the course of other fabrication procedures.

However, when electrolytic etching is employed to shape semiconductive bodies for use in devices requiring extremely accurate configurations, control of the etching process becomes very important and even critical. For example, in making certain types of transistors suitable for use at high frequencies, it is highly desirable to provide a semiconductive body of extremely small thickness, preferably with substantially parallel opposite surfaces. This body is ordinarily to be provided with one or more conducting electrodes, thereby to produce a transistor of either the monopolar or bipolar conduction type. To fabricate reproducibly a semiconductive body of the requisite thinness and parallel surface configuration has been a major problem in the fabrication of such high-frequency transistors. In addition, there often exists also the problem of providing a low-resistance ohmic connection to such thin bodies of semiconductor, for example to provide a low-resistance path for base current when the body is used as a transistor device.

Accordingly, it is an object of my invention to provide an improved method for controlling the electrolytic etching of a semiconductive body.

Another object is to provide a method for controlling the rate of electrolytic etching of a depression in a semiconductive body.

Still another object is to provide a method of producing a reproducibly thin region of semiconductive material.

It is another object to provide such a region which is of single-crystalline form.

Another object is to provide an improved method for producing a body of semiconductive material having therein a restricted region of extreme thinness.

A further object is to provide a method for fabricating a semiconductive body having a region of extreme thinness characterized by substantially parallel opposing surfaces.

A still further object is to produce thin regions of substantially identical thicknesses in semiconductive bodies whose original thicknesses may differ appreciably.

Another object is to provide a method for producing a semiconductive body having a surface adjacent, but spaced from, a potential barrier in said body.

A further object is to provide an improved method for fabricating semiconductive circuit devices such as photocells, transistors and the like.

Still another object is to provide improved photocells and transistors characterized by excellent frequency response.

It is another object to provide a method for fabricating such photocells and transistors with a high degree of accuracy and reproducibility.

In accordance with the invention, the above objects are achieved in the following manner. An electrolytic etchant and an appropriate etching potential are applied to a semiconductive body so as to produce progressive electrolytic etching of at least one surface thereof. The progress of the etching, as to direction and/or rate, is then further controlled, through control of the distribution of the electrical currents within the semiconductor. Preferably the current distribution is controlled by differences in the effective resistances of various parts of the semiconductive body. For example, in a preferred embodiment described in detail hereinafter I make use of the effective high-resistance of a current-carrier depleted region associated with a potential barrier produced within the body, this depletion region being electrically controllable by variation of its reverse-bias to vary the nature and extent of its effect upon the progress of etching. However, particularly when semiconductive materials of relatively high resistivity are employed, it is also possible to control the current distribution by utilizing an auxiliary control potential, ohmically applied to the semiconductive body in addition to the normal etching potential, in such manner as to produce abrupt changes in the current distribution in limited regions normally subjected to the etching action and thereby also further to control the etching process.

My novel method will be described in detail hereinafter with particular reference to the production of a new transistor type which I have found to be of special utility in high-frequency electrical circuits. This transistor preferably comprises a body of semiconductive material having a region of reduced thickness in which there are formed two or more active elements, such as the emitter and collector of a bipolar transistor or the gate elements of a monopolar transistor. This region is made sufficiently thin, and with sufficiently parallel opposite surfaces, to provide marked improvements in frequency response and/or gain of the device. The remainder of the wafer is made sufficiently thick to provide strong support for the thin region and to provide a relatively low-resistance current path from the region of reduced thickness to an external circuit connection, as is desirable in reducing the base resistance of the structure when used in a bipolar transistor.

To provide the desired thin region of semiconductor, I prefer to utilize the relatively high resistance of the depletion layer associated with a reverse-biased potential barrier to modify the normal current distribution immediately beneath one surface of the semiconductive body, thereby to arrest the etching action completely or in part just below the surface. This I accomplish in one preferred embodiment, by applying a rectifying area-contact to one surface of the body, applying a reverse bias to this contact, and at the same time applying an electrolytic etchant and an etching potential to another portion of the body. Etching then proceeds until the depletion region is reached, at which time its progress toward the opposite surface is slowed or stopped, leaving the desired thin region when the etching forces are removed.

Because of the slowing or stopping of the etching action in the direction of the depletion region, the possibility of destroying the thin region of semiconductor by etching all the way through is greatly reduced or eliminated and at the same time the etched surface is caused to conform to the predetermined and controllable configuration of the inner edge of the depletion region. By causing the depletion region to parallel the surface toward which etching progresses, substantially parallel, closely-spaced surfaces of semiconductor may be produced over a substantial area. In addition, by controlling the magnitude of the reverse bias during etching, the thickness of the material may also be controlled.

The resultant structure may itself be used as a sensitive, high-frequency photocell, or, another rectifying contact may be applied to the etched side of the thin region to form a high-frequency transistor. Alternatively, if a reproducibly thin body of semiconductor is desired for any purpose whatsoever, the plated contact may be selectively etched away leaving a body of single conductivity-type germanium.

Other objects and features of the invention will be readily appreciated from a consideration of the following detailed description, in connection with the accompanying drawings, in which.

Considering now the invention in more detail, there will first be described an application of the method to provide a region of reproducibly thin N-type germanium, and to produce therefrom photocells or transistors of superior characteristics.

Figure 1:
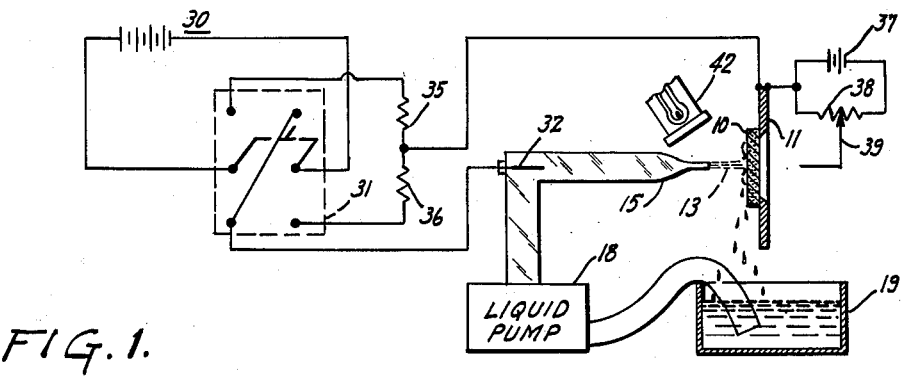
FIGURE 1 is a diagram of apparatus useful in practicing the method of my invention in one form.

In FIGURE 1 there is shown schematically an arrangement for alternately jet-etching and jet-plating electrolytically a wafer 10 of semiconductive material, in the present instance N-type germanium of single-crystalline-form having a lifetime for minority-carriers and a resistivity suitable for use in semiconductive devices of the type mentioned above. Since such jet-processing apparatus and its mode of operation have been described in detail in the above-mentioned copending application No. 395,756, now abandoned, and in Serial No. 395,823 of Richard A. Williams and John W. Tiley, filed December 2, 1953, now abandoned, and entitled "Electrical Device," it will be necessary here only to describe the general characteristics thereof, insofar as they are particularly applicable to the present process.

In the present instance, semiconductive wafer 10 with ring-shaped ohmic base plate 11 soldered thereto is held by any suitable means in the position shown, so as to be impinged by an electrolytic jet 13 directed against a surface region of wafer 10 opposite the central aperture in plate 11. Typically the jet may have a diameter of 10 mils, and the wafer 10 may be about 3 mils in thickness. Jet 13 is formed by nozzle 15, which in turn is supplied with electrolyte under pressure by pump 18 from reservoir 19. When only etching is to be performed, an aqueous solution of 2 grams of sodium nitrite per liter is a suitable electrolyte. However, if the same solution is to be used for both etching and plating, the electrolyte is preferably so chosen as to comprise an electrolytic etchant for N-type germanium when current is passed in one direction, and to comprise a metallic electroplating solution with the opposite polarity of current flow; an aqueous solution of zinc sulphate is suitable for the latter purpose.

Potential source 30 cooperates with double-pole double-throw switch 31 to provide a potential difference of controllable polarity between inert electrode 32, immersed in the lectrolyte, and base plate 11. Variable resistors 35 and 36 permit control of the magnitude of this applied potential, and hence of the electrolytic current. In addition there are provided auxiliary potential source 37, and resistor 38 connected in parallel therewith and having a variable tap 39 for permitting the application of a negative potential to a selected region of body 10 as by an appropriate low-resistance spring-contact for example. As will become apparent hereinafter, this auxiliary potential is used later in the process as a control bias to control the progress of the electrolytic etching. A source 42 of controllable illumination of the etching surface is also preferably provided as shown, for reasons which will become apparent hereinafter.

As is also described in the cited copending applications, if the wafer 10 is made positive with respect to the jet 13 by throwing the double-pole, double-throw switch 31 into its upward position, local electrolytic etching confined substantially to the region under jet 13 will be initiated and, if permitted, will continue until a hole has been drilled through wafer 10. When it is desired to provide an extremely thin region of semiconductor under the jet, without perforating the wafer, the electrolytic etching action should be terminated, as by removal of the wafer or of the jet or by discontinuance or reversal of the etching current, immediately prior to the time when perforation of the wafer would otherwise occur. By throwing switch 31 to its downward position, electroplating of the semiconductive surface under the jet may also be provided when a suitable metal-salt electrolyte is used.

In accordance with the present embodiment of the invention, the jet etching and plating process is first utilized to provide a rectifying area-contact to one surface of wafer 10. For this purpose, the jet etching is initiated in the manner described above but is preferably discontinued well before the desired final thickness is approached. As shown in the drawings, etching is, in fact, preferably discontinued as soon as a suitably clean, unstressed and undistorted crystalline surface has been exposed. At this time switch 31 is reversed to deposit upon the etched surface a suitable metal contact 48, shown in FIGURE 2. The metallic deposit 48 then provides a rectifying contact of the surface-barrier type to the germanium wafer 10. It will be understood that while the foregoing description is indicative of one method by which a suitable rectifying metallic contact of controllable configuration and location may be produced upon one of the surfaces of wafer 10, other methods for producing similar rectifying contacts may also be utilized where desirable.

Figure 2:
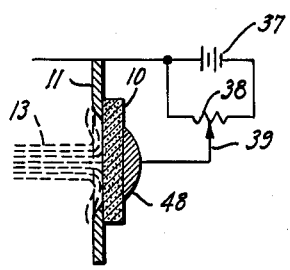
FIGURES 2, 3, 4 and 5 are sectional views showing a semiconductive structure in successive steps of fabrication by my method.

In the next step, as shown in FIGURE 2, the wafer 10 is reversed in position so that the jet 13 impinges the surface opposite that upon which contact 48 was previously plated, and the rectifying contact between wafer 10 and contact 48 is biased in the reverse direction by connecting tap 39 to contact 48 by light spring-contact for example. With N-type germanium such as is utilized in the present embodiment, the polarity of voltage necessary to produce reverse-biasing is such that contact 48 is negative with respect to wafer 10. The extent of this reverse-bias is adjustable by variation of the tap 39 on resistor 38, a typical value being of the order of 10 volts when shaping the wafer for transistor use.

Figures 3, 4, 5:
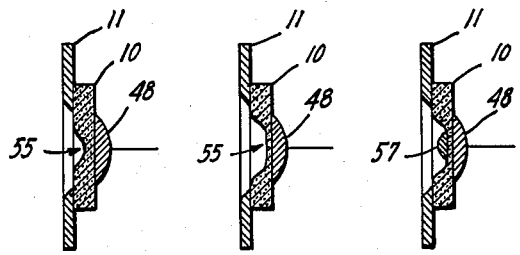

Throwing switch 31 to its upper position, electrolytic etching by jet 13 is instituted. After a relatively short period of tme typically of the order of several minutes, the etching action of jet 13 will have produced a curved-bottomed depression 55 as shown in FIGURE 3 extending approximately halfway through wafer 10. Etching may then be continued for a time equal to that which, in a case such as that shown in FIGURE 1 where no reverse-biased contact is utilized, would be sufficient to produce perforation of wafer 10. However, as is shown in FIGURE 4, the depression 55 will not yet have reached contact 48 but instead will have at most approached closely the opposite surface of wafer 10, and will normally be characterized by a substantially flatter bottom portion than would characterize a depression of equal depth produced by the arrangement of FIGURE 1. Depending upon the choice of the various elements of the system and their adjustment, etching may in fact be continued for a period of time long compared to that normally producing perforation, without producing such perforation and while producing an increasingly-extensive flat surface at the bottom of depression 55. Termination of etching during this latter period will then provide a germanium region of controlled thinness and with substantially parallel opposite surfaces, as is desired for many high-frequency semiconductive devices.

I have found that the device of FIGURE 4 may, in itself and without further processing, be utilized as a highly sensitive photocell, the reverse current between wafer 10 and contact 48 being highly sensitive to variations in the intensity of electromagnetic radiation falling upon the bottom of depression 55. Not only is the sensitivity of this photocell excellent, but it is also typically characterized by predictably superior high frequency performance. For example, the sensitivity of such devices is typically about 7 milliamperes per lumen over a light spectrum extending from 0.5 to 1.6 microns wavelength. These uniformly superior characteristics are due at least in part to the controllably thin layer of single-crystalline semiconductor covering electrode 48 and obtained by the bias-controlled etching procedure described above.

To make a transistor device from the structure of FIGURE 4 when the electrolyte is zinc sulphate for example, switch 31 may be thrown to its downward position to produce plating of the zinc metal upon the bottom of depression 55, thereby to provide a second rectifying contact upon wafer 10 which, after suitable chemical etching as described in the above-mentioned copending applications, will have the general form of contact 57. The resultant device is then useful as a surface-barrier transistor of the type described in copending application Serial No. 395,823, where contacts 57, 48 and 11 are the emitter, collector and base contacts respectively. However, if desired the assembly may be heated so as to diffuse the deposited metal slightly into the germanium, thereby to produce a junction-type transistor. When the solution used in the etching step is sodium nitrite, application of the electrode 57 will usually require changing to a jet of a different electrolyte, such as zinc sulphate, during the plating procedure.

From the foregoing, two of the outstanding advantages of the present method will be readily appreciated. First, since the distance between the opposing surfaces of the wafer remains at or near the desired small value for substantial periods of time compared to the total etching time, the instant at which etching should be terminated to prevent perforation becomes non-critical. For example, typically there will be little change in the minimum thickness of the germanium member between the bottom of depression 55 and the contact 48 whether the total etching time is 6 minutes or 30 minutes. The close spacing of emitter and collector contacts which is desirable for high-frequency transistor operation is therefore readily obtained without requiring critical control of system parameters, of the original thickness of the semiconductive body, or of the time of etching. Secondly, the fact that the bottom of the depression tends to conform to the contour of the electrode 48, no matter what its exact shape, results in more nearly parallel opposing surfaces of germanium, as is also very desirable in high frequency transistors.

Figure 6:
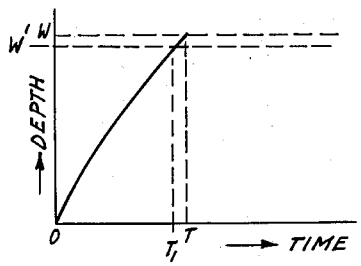
FIGURES 6 and 7 are graphical representations referred to hereinafter in explaining the nature of my method.
Figure 7:
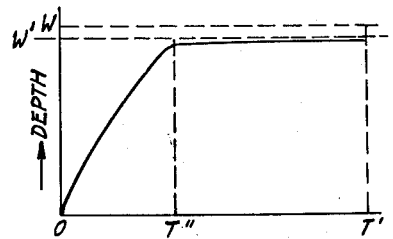

The detailed nature of the etching process used to obtain the above-described improved results will be more readily appreciated from the following considerations and from reference to FIGURES 6 and 7, which, it is understood, are for purposes of explanation only and are not necessarily quantitatively indicative of the exact relations existing in all applications. The rate of electrolytic etching is determined in large measure by the density of the etching current existing between the jet and the region of the germanium wafer impinged thereby. In the absence of bias on electrode 48, the resistivity and the current distribution are substantially uniform throughout the bulk of the wafer 10, and the etching rate, while not necessarily precisely linear, nevertheless proceeds at a relatively rapid rate throughout, including the time just prior to perforation. As an example, reference is made to the graph of FIGURE 6, wherein depth of etching is plotted vertically and time of etching is plotted horizontally, an etching depth equal to the width of the wafer 10 being represented by the ordinate value W, the optimum depth required for satisfactory semiconductive devices being designated W'. From this graph it will be apparent that, while it is possible in some cases so to control the parameters of the system that etching is terminated at about the time $T_1$ when the desired thickness W' exists, and before the time T when perforation occurs, nevertheless since etching is proceeding relatively rapidly at this time, the wafer thickness remains near the optimum value only briefly compared to the total etching time. The proper time for terminating the etching is therefore relatively critical and difficult to determine under varying conditions of wafer thickness and system adjustment.

However, when the reverse-biased etching arrangement shown in FIGURE 2 is utilized, etching proceeds in the general manner shown by the curve of FIGURE 7, wherein letters corresponding to those in FIGURE 6 indicate corresponding quantities. Here it will be seen that, since the rate of change of the depth of depression 55 is substantially arrested at the desired depth W', the time interval during which an acceptable thickness of semiconductor exists is long. For example, the thickness of the semiconductor is approximately optimum during the interval T" to T', and continues to remain so for a relatively long time after T'. In FIGURE 7 the time of perforation T has not been shown since it may be very large compared to T', and appears to depend principally upon the care with which the process is performed; for example, when care is taken to utilize clean equipment and solutions, to avoid undue mechanical strains on the wafer and to avoid excessively high etching currents, the progress of etching may be arrested for hours. The time of termination of etching therefore becomes noncritical, and substantial variations in system parameters and in original material thicknesses are possible without adversely affecting the reproducibility of the thin section of germanium.

Although not intending to be bound by any particular theory as to the exact nature of the arresting process, I believe the following to be the proper explanation of its causes. When the rectifying contact between electrode 48 and wafer 10 is biased in the reverse direction, a barrier region is produced immediately under the electrode which is substantially depleted of current carriers and therefore is of relatively high resistance compared to the remainder of the wafer. The width of this depletion region increases as the reverse-bias is increased, and may readily have a width of the order of 0.0003 inch for example. As a result, nearly all of the current flowing from base plate 11 to jet 13 flows through the bulk of wafer 10 and very little if any through the higher-resistance depletion layer. While this distortion of the current distribution does not materially inhibit or modify the etching process at its start, nevertheless when the bottom of the depression approaches closely and reaches the depletion layer, the low-resistance paths for current from tab 11 to the bottom of the depression are substantially eliminated and etching of such surface portions in the direction of electrode 48 is therefore greatly slowed or stopped. Other portions of the depression which have not yet reached the depletion layer will, however, continue to etch relatively rapidly.

Figure 8:
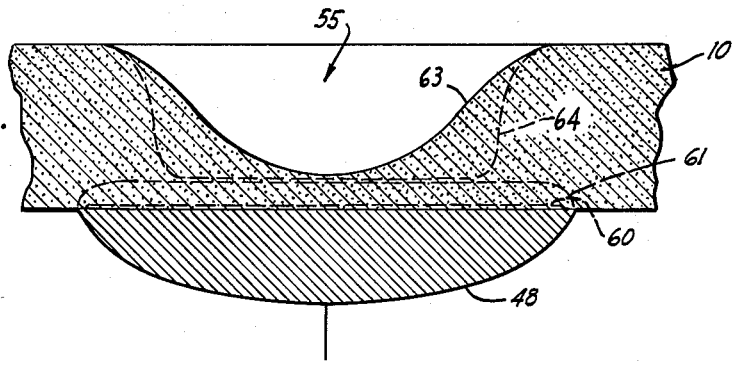
FIGURE 8 is an enlarged sectional view to which reference is made in explaining the theory of the invention.
Figure 9:
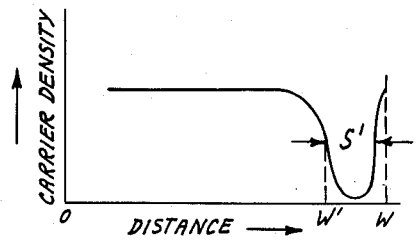
FIGURES 9 and 10 are graphical representations also referred to in setting forth the theory of the invention.
Figure 10:
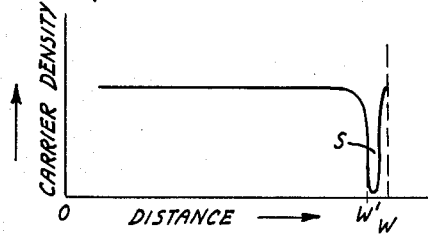

This theory of the nature of the effect which I utilize will be more readily understood from a consideration of FIGURES 8, 9 and 10. FIGURE 8 represents diagrammatically the conditions existing in wafer 10 near the end of the etching process and as the bottom of depression 55 approaches and reaches the depletion layer under electrode 48, while FIGURES 9 and 10 indicate the general form of the distribution of current-carriers across the thickness of wafer 10 prior to etching, with and without external reverse-bias, respectively.

In FIGURE 10, ordinates represent densities of current-carriers in, and abscissae represent distance through, the semiconductive wafer, the origin corresponding to the original position of the surface to which jet 13 is applied while W represents the position of the opposite surface immediately under contact 48. It will be seen that the density of current-carriers is substantially uniform throughout the bulk of the wafer 10, but that the density drops abruptly to a much lower value within a region of width S adjacent the surface. This region, extending substantially from W' to W, is therefore the depletion region referred to hereinbefore, and is characterized by a relatively high electrical resistivity. It exists in substantially the form shown with zero applied voltage between contact 48 and wafer 10, and will therefore be referred to hereinafter as a natural barrier. The position of the inner side W' of this region, hereinafter referred to as the "edge" of the depletion region, is shown in FIGURE 8 by dotted line 60.

When a reverse bias of about 10 volts is applied to contact 48, the depletion region is widened as shown in FIGURE 9, wherein the characters and coordinates correspond to those in FIGURE 10. With such reverse bias, the width of the depletion region widens from the value S to the value S', and the edge W' of the depletion layer moves inwardly to the position shown. The edge of the depletion region with reverse bias is then as shown in FIGURE 8 by broken line 61.

Considering FIGURE 8 now in more detail, solid line 63 represents the outline of the depression 55 as it approaches closely the edge 61 of the reverse-biased depletion region. It will be seen that just prior to reaching edge 61 of the depletion layer, the center of the bottom of depression 55 can be supplied with electric current only by way of the relatively thin body of semiconductor between it and the edge 61. This restriction of the current path produces an appreciable increase in the resistance encountered by currents to the bottom of the depression, and hence, even prior to reaching the depletion layer, there is a tendency for the progress of the etching of the center of the depression to slow. When the depletion layer is actually reached, the only path for current to the center of the depression is by way of the high-resistance depletion layer. This path is of such high resistance that the current provided to the bottom of depression 55 is well below that required for appreciable etching and in most cases prevents any substantial etching of this region at all. However, etching of other surface portions of depression 55 may still continue at substantially the former rate, until they also encounter the depletion region. Thus, with continued etching the sides of depression 55 advance while the center advances only slightly if at all, resulting in the more nearly straight-sided, flat-bottomed depression shown by dotted line 64.

By terminating etching after the configuration of line 64 has been obtained, there is provided a relatively large surface at the bottom of depression 55 which is parallel to and closely spaced from the opposite surface of wafer 10. Since the arresting action of the reverse-biased barrier causes the bottom of the depression to remain at substantially the same distance from the opposite surface for a relatively long period of time, substantial variations in the original thickness of the wafer, and in the time and rate of etching can be accommodated without danger of perforation and while leaving a thin region of semiconductor of reproducible thickness. This thickness is also readily controlled by selection of the magnitude of the applied reverse-bias. As shown in FIGURE 8, in making transistors I prefer to select this bias so that the thickness of the remaining semiconductive material is more than twice the thickness of the barrier produced under normal operating conditions, so that the barriers at the emitter and collector of the resultant transistor will be spaced apart at least to some degree during such normal operation, a typical thickness being about 0.2 mil.

It will therefore be appreciated that by utilizing a reverse-biased electrode opposite the electrolytic jet, the original distribution of the etching currents within wafer 10 is modified from that usually obtaining, in such manner that etching in the direction of the reverse-biased electrode is substantially arrested at a predetermined depth.

In employing the above-described process, one factor not thus far considered which is preferably subjected to control is the illumination of depression 55 during the etching process. I have found that when the illumination is moderate, of the order of 10 foot-candles for the particular case discussed above, the etching rate in the absence of reverse-biasing will have the general form of variation discussed in connection with FIGURE 6, while with the reverse-biased electrode present it will have the form shown in FIGURE 7. However, when the illumination is reduced to relatively small values, for example one foot-candle or less, then the etching is in general less rapid and more dependent upon the precise magnitude of the illumination. Furthermore, for a given value of control bias at electrode 48, the width of the depletion layer in the underlying semiconductor is generally wider in the absence of light and the etching tends to be arrested earlier. For these reasons, I prefer to utilize increased values of illumination of the etching surface to accelerate the early portion of the etching process, but to maintain the illumination at a predetermined and preferably low level when the etching has progressed to the depth at which the arresting action is to begin. It is for these reasons that the source of illumination 42 is shown in FIGURE 1.

I have also found that rapid rotation of the semiconductive body during etching about an axis normal to the etched surface is often helpful in obtaining uniform results, since the etching fluid is then thrown off the wafer in a uniform manner and a consistent, rapidly-flowing fluid pattern is thereby assured. Beveling of the inner edges of the ring-shaped base plate 11 as shown also facilitates the smooth flow of the electrolyte.

Appropriate values for the various parameters of the system and of the process are suitably found by experimental variation under the particular conditions in which the process is to be employed, and specific procedures for etching are described in the cited copending applications. However, as an example only and in the interest of complete definiteness, in one particular application of the process I have used a wafer of single-crystalline germanium of 5 ohm-centimeters resistivity and approximately 3 mils thickness, an electrolyte comprising 2 grams of sodium nitrite per liter of water, and a rectifying control contact 48 formed by electroplating zinc upon a freshly-etched region of the germanium wafer. With a reverse bias of 10 volts applied to electrode 48, a 10 mil diameter electrolytic jet was applied to the opposite surface of the wafer, with an etching potential sufficient to provide an etching current of about 1 milliampere with an illumination of about 10 foot-candles. Etching was then found to proceed about 80% of the way across the wafer in 5 minutes; after 30 minutes of continuous jet etching, perforation of the wafer had not occurred and a substantially flat-bottomed depression had been formed leaving about 0.15 mil of germanium beneath its bottom.

When applying the method to the etching of P-type germanium, I prefer to utilize a P-N junction to arrest the etching process, rather than an area-contact. This is readily accomplished by heating the wafer and the electro-deposited control contact for a brief period sufficient to insure a small amount of diffusion of the metal into the germanium. In this case the metal should therefore be a donor-type impurity metal such as antimony for example. Also, when applying the method to P-type germanium, the polarity of potential required to reverse-bias the control barrier is obviously opposite to that described for N-type material, i.e. the contact is positive with respect to the body of semiconductor. Although with P-type material the etching rate is usually more nearly independent of illumination, the process is otherwise analogous to that for N-type.

When the semiconductive material utilized is silicon, similar procedures may also be employed, as set forth in the copending application Serial No. 395,756. In some instances when employing silicon, I have found it advantageous to utilize a chemical etch such as hydrofluoric acid to clean and expose the silicon surface immediately before the electrolytic etchant is applied, since the silicon surface tends to form etch-resistant chemical compounds. Application of strong illumination is also useful in facilitating the initiation of silicon etching.

While depletion-layer control is particularly useful in connection with jet electrolytic etching, it may also be employed with bath-etching arrangements. In this case the desired localization of etching may be provided by covering all but the region to be etched with an etch-resistant coating. Such a modification of the process may be accomplished with the apparatus shown in FIGURES 11 and 12, wherein corresponding numerals indicate corresponding parts.

Figure 11:
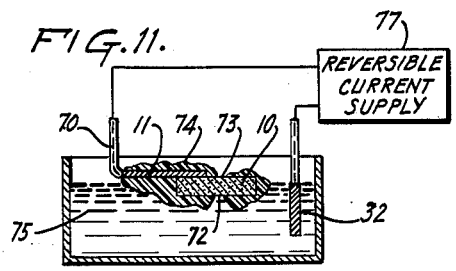
FIGURES 11 and 12 are diagrammatic representations illustrating steps in the practice of my method in another form thereof.

FIGURE 11 illustrates the manner in which the control electrode 48 may be applied by bath-etching techniques. Here base plate 11, connecting lead 70 and wafer 10, with the important exception of small regions 72 and 73 located on directly opposite surfaces of the wafer, are covered with a protective coating 74 of paraffin which does not dissolve to a substantial degree during electrolytic etching but which may readily be dissolved after etching by an appropriate chemical such as benzene. This assembly is immersed in the electrolytic etchant 75 sufficiently to expose region 72 to the electrolyte, which may comprise an aqueous solution of zinc sulphate for example. Appropriate etching and plating potentials are then applied in sequence as before by means of reversible current supply 77. Preferably some agitation of the solution is provided, as by moving wafer 10, so as to provide fresh solution to the unprotected surface region 72 during the etching and plating processes.

Figure 12:
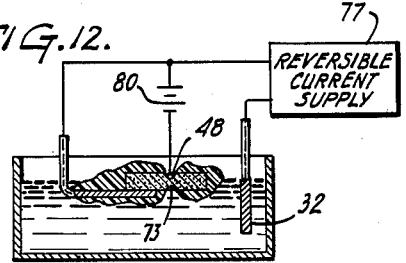

After electrode 48 has been formed, as shown in FIGURE 12 the wafer may be reversed in electrolyte 75 so that the surface region 73 is exposed to the etching action. As in the case of jet etching, a reverse bias is applied to electrode 48, by means of a potential source 80. In this case also the depletion layer due to the reverse-bias on contact 48 will slow or arrest the electrolytic etching action when the edge of the depletion layer is approached and reached, producing flattening of the bottom of the etch-pit, improved control of the thickness of the material and non-criticality of etching time.

Figure 13:
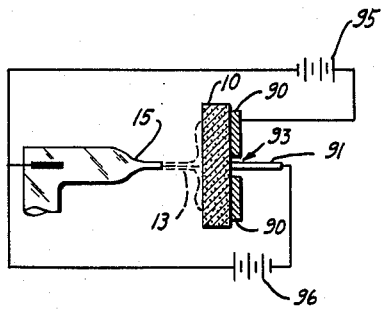
FIGURE 13 is a diagram of apparatus useful in practicing my invention in still another form.

In addition to the above-described control of electrolytic etching by means of artificially-induced high-resistance regions, it is also possible to control the currents within the semiconductive body during etching by applying auxiliary controlling potentials to the body through substantially ohmic contacts, thereby to control the progress of the electrolytic etching. Such a process may be performed utilizing the arrangement illustrated in FIGURE 13 for example. In that figure, numerals 10, 13 and 15 again indicate the semiconductive wafer, the electrolytic jet and the jet-forming nozzle respectively, and in this instance wafer 10 is preferably of relatively high resistivity and is provided with two substantially ohmic electrodes 90 and 91, electrode 90 hereinafter designated the ring electrode being substantially coextensive with the rear surface of wafer 10 and having a central circular aperture 93 therein through which electrode 91, hereinafter designated the control electrode, makes contact to a limited region of wafer 10. Jet 13 of a suitable electrolyte is directed against the surface of wafer 10 immediately opposite electrode 91, and electrodes 90 and 91 are provided with potentials differing from that of the jet 13 by means of potential sources 95 and 96 respectively. In the arrangement shown, the polarities of the sources of potential are such that the ring electrode 90 is positive with respect to the jet, tending to produce etching of the wafer 10. However, control electrode 91 is biased negatively with respect to the jet, modifying the current distribution in the wafer so that current from the ring electrode, which would otherwise flow past the surface region contacted by electrode 91, is diverted to electrode 91. Therefore, when the jet 13 has etched a depression having a bottom approaching the surface contacted by the control electrode, the amount of current available to flow to the bottom of the depression diminishes and etching of the bottom of the depression slows, as in the previously-discussed case of the rectifying control electrode. Stated from a slightly different viewpoint, since the wafer 10 is a semiconductor of substantial resistivity, substantial local differences in potential can be produced with moderate current. Hence the control electrode 91 can produce beneath it a local region of negative potential which prevents further etching in that direction.

Figure 14:
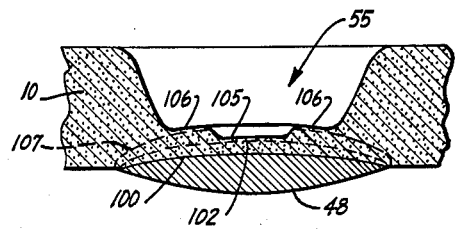
FIGURE 14 is a sectional view illustrating how the invention may be applied to produce other configurations of semiconductive material.

In the embodiments of my invention described thus far, the purpose has usually been to produce a region of semiconductor of substantially uniform thickness, and for this purpose the control potential is maintained sub-stantially constant after the etched surface has reached the control region. However, it is also contemplated that the control potential may be varied after the control region has been reached to produce other desired configurations of semiconductor. For example, FIGURE 14 illustrates a special configuration which may be produced by changing the control potential after the control region has been reached. In this case control electrode 48 may be of zinc providing a rectifying contact to the previously jet-etched, curved surface 100 of wafer 10, and may be applied in the manner previously described with reference to FIGURE 1. Initially a relatively low reverse bias, for example 8 volts, may be applied to electrode 48, and jet etching of depression 55 continued until arrested near the center of the depression by the edge 102 of the depletion region. Etching may then be continued until the central region 105 is formed, which is slightly convex so as to remain parallel to the opposing curved surface 100. Next the reverse bias may be abruptly increased, to 25 volts for example, and maintained at the latter value until the outer portions 106 of the etched depression conform to the edge 107 of the correspondingly thicker depletion layer. Etching may then be discontinued leaving the depression shown, the bottom of which defines two adjacent regions of controlledly different thicknesses. Such a configuration has been found useful for experimental purposes, for example in the measurement of the effects of different thicknesses of germanium upon the optical absorption properties thereof.

Although the invention has been described with particular reference to specific preferred embodiments thereof, it will be understood that it is susceptible of embodiment in a diversity of forms without departing from the spirit thereof. For example, depending upon the particular application, one may vary any or all of the several parameters, such as the magnitude of the reverse-bias or of the auxiliary potential, the etching potential, the nature or character of the electrolyte, or the illumination, to achieve special effects or for other reasons. For example, the etching may be produced in response to an alternating, rather than a direct, potential when convenient. It is also possible to produce the desired localized variations in resistance or potential by means other than the metallic contact electrodes described, for example by means of a conducting electrolyte in contact with the region to be affected. Finally, it will be understood that the invention is applicable to the production of semiconductor configurations other than the ones described and shown in detail, such as the ring-type semiconductive device described in the cited copending applications, in the manufacture of which a jet of etchant is caused to produce a depression in the form of a ring.

I claim:

1. The method of providing a region of controllably reduced thickness in a body of semiconductive material, comprising the steps of directing a jet of an electrolytic etchant against a first surface region of said body, applying an etching potential between said jet and a second surface region of said body to produce progressive etching of a depression in said body, forming a rectifying contact to a third surface region of said body opposite said first surface region, applying a reverse-bias to said rectifying contact during said etching to produce a depletion region in the path of said progressive etching, and continuing said directing of said jet and said applying of said etching potential and said reverse bias until a surface region of said depression substantially reaches said depletion region.

2. The method of fabricating a semiconductor device comprising the steps of forming a rectifying barrier in a first region of a semiconductive body, said barrier having a depletion zone extensible toward a first surface of said body confronting said barrier in response to increases in reverse bias applied to said barrier, biasing said barrier in the reverse direction to extend said depletion zone toward said first surface, electrolytically etching said first surface to cause said first surface to approach said extended depletion zone, continuing said etching until after said surface has substantially reached said extended depletion zone and has been slowed thereby, and terminating said etching after said slowing of said etching by said depletion zone.

3. In a method for electrolytically etching a semiconductive body containing a first surface region to which an electrolytic etchant is applied and a second region to which an etching potential is applied, controlling the progress of said etching by the steps of applying a rectifying connection to a third region of said body to form, between said first and second regions, a depletion zone of a thickness controllable in response to a reverse bias applied to said connection, and applying to said rectifying connection a reverse bias independent of said etching potential, to control said thickness of said depletion zone.

4. The method of controlledly etching a body of semiconductive material of a single conductivity-type which comprises forming a rectifying connection to a surface of a first region of said body, said rectifying connection having associated therewith a depletion zone extensible toward the surface of a second region of said body adjoining said first region, applying to said surface of said second region an etching substance operative to etch said last-named surface in the direction of said rectifying connection when the potential of said etching substance with respect to the potential of said body in said second region is within a predetermined range, applying a voltage between said etchant and a third region of said body adjoining said first and second regions to maintain said etching substance at a potential with respect to said second region for which etching of said surface of said second region normally occurs, and, while isolating the periphery of said rectifying connection and at least the immediately surrounding surface of said body from said electrolyte and during said applying of said etching substance and said voltage, applying to said rectifying connection a reverse-bias sufficiently large to extend said depletion zone substantially toward said surface of said second region and to reduce the rate of said normal etching in the direction of said rectifying connection when said normal etching substantially reaches said depletion zone.

5. The method of claim 4, wherein said body is of N-type material and said voltage maintains said etching substance negative with respect to said third region of said body.

6. The method of claim 4, wherein said body is wafer-shaped and said rectifying connection and said etching substance contact said body opposite each other on opposite major surfaces of said wafer-shaped body.

7. The method of claim 6, wherein each point on the periphery of said rectifying connection is spaced inwardly of the periphery of the major surface on which it is located.

8. The method of claim 4, wherein said semiconductive body is rotated during said application of said reverse-bias.

9. The method of controlledly reducing the thickness of at least a portion of a wafer of N-type single-crystalline germanium, which comprises the steps of forming a rectifying connection to one major surface of said wafer, said rectifying connection having associated therewith a depletion zone extensible toward but initially spaced from the other major surface of said wafer, applying an electrolytic etchant to said other major surface of said wafer opposite said rectifying connection while maintaining the periphery of said connection and at least the immediately surrounding surface of said wafer free of said etchant, applying between said etchant and a region of said wafer spaced from said rectifying connection a voltage normally producing etching of said other major surface by said etchant, and, while applying said etchant and said voltage, maintaining said rectifying connection negative with respect to said body by an amount sufficient to extend said depletion zone substantially to said surface being etched to reduce the rate of said normal etching when it substantially reaches said depletion zone.

10. The method of claim 9, wherein said rectifying connection is formed with its entire periphery spaced inwardly of the periphery of said one major surface, wherein said etchant and said voltage normally producing etching are applied to produce normal etching preferentially in the portion of said other major surface directly opposite said rectifying connection, wherein the entire area of said one major surface is maintained free of said etchant, and wherein said negative potential is sufficiently great and said voltage normally producing etching is sufficiently small that etching of said portion of said other major surface is arrested substantially completely when it has progressed to a predetermined depth.

11. A method for electrolytically etching a semiconductor body which comprises the steps of applying to the surface of a first region of said body an electrolyte effective to etch said surface when said body is positive with respect to said electrolyte, applying to a second region of said body adjoining said first region a potential positive with respect to said applied electrolyte thereby to produce normal etching of said surface by said electrolyte progressively further into said body, and applying to a third region of said body opposite said first region a negative potential with respect to said body, said negative potential being sufficiently large to modify substantially said normal etching when said normal etching has progressed into said body beyond a predetermined depth and for a predetermined time, and continuing said normal etching after said predetermined time while applying said negative potential.

12. The method of shaping a semiconductive body provided with a rectifying connection thereto, said rectifying connection having an associated depletion zone initially spaced from an opposed surface of said body but extensible toward said surface in response to reverse bias applied to said connection, said method comprising the steps of electrolytically etching said surface of said body to cause said surface progressively to approach said depletion zone, illuminating said surface during an interval of said etching during which said surface is spaced substantially from said depletion zone to accelerate said etching, continuing said etching during a second interval after said initial interval until a time at which said surface has etched substantially to said depletion zone, decreasing the illumination of said etched surface after said initial interval and prior to said time, and applying a reverse bias to said rectifying connection during a period extending from after said initial interval until after said time to extend said depletion zone toward said surface and to slow said etching when it substantially reaches said depletion zone.

13. The method of providing a region of controllably reduced thickness in a body of semiconductive material, comprising the steps of directing a jet of an electrolytic etchant against a first surface region of said body, applying an etching potential between said jet and a second surface region of said body to produce progressive etching of a depression in said body, forming a rectifying contact to a third surface region of said body opposite said first surface region, applying a fixed voltage reverse-bias to said rectifying contact during said etching to produce a depletion region in the path of said progressive etching and continuing said directing of said jet and said applying of said etching potential and said reverse bias until a surface region of said depression substantially reaches said depletion region.

References Cited in the file of this patent
UNITED STATES PATENTS 2,656,496 Sparks _____ Oct. 20, 1953
2,695,930 Wallace _____ Nov. 30, 1954

OTHER REFERENCES

"Proc. of the I.R.E.," December 1953, by Tiley et al., pp. 1724–1728.